United States Patent [19]
Suzuki et al.

[11] Patent Number: 5,297,527
[45] Date of Patent: Mar. 29, 1994

[54] DIAGNOSING APPARATUS OF EVAPORATION FUEL CONTROL SYSTEM OF VEHICLE

[75] Inventors: Harumi Suzuki; Takeshi Mukai; Hitoshi Nakashima, all of Shizuoka, Japan

[73] Assignee: Suzuki Motor Corporation, Shizuoka, Japan

[21] Appl. No.: 996,955

[22] Filed: Dec. 23, 1992

[30] Foreign Application Priority Data

Dec. 28, 1991 [JP] Japan .................. 3-360651
Dec. 28, 1991 [JP] Japan .................. 3-360654

[51] Int. Cl.$^5$ .................................... F02M 33/02
[52] U.S. Cl. ........................... 123/520; 123/198 D
[58] Field of Search ............ 123/520, 198 D, 519, 123/518, 516, 516, 514

[56] References Cited

U.S. PATENT DOCUMENTS

| | | | |
|---|---|---|---|
| 4,343,281 | 8/1982 | Uozumi | 123/520 |
| 4,926,825 | 5/1990 | Ohiaka | 123/520 |
| 5,027,280 | 7/1991 | Uranishi | 123/520 |
| 5,056,494 | 10/1991 | Kayanuma | 123/519 |
| 5,105,789 | 4/1992 | Aramaki | 123/520 |
| 5,123,459 | 6/1992 | Toshihiro | 123/520 |
| 5,158,059 | 10/1942 | Kuroda | 123/479 |
| 5,193,511 | 3/1993 | Fujino | 123/520 |

FOREIGN PATENT DOCUMENTS

| | | | |
|---|---|---|---|
| 0091357 | 5/1983 | Japan | 123/520 |
| 2-130255 | 5/1990 | Japan . | |
| 3-26862 | 2/1991 | Japan . | |

*Primary Examiner*—Carl S. Miller
*Attorney, Agent, or Firm*—Flynn, Thiel, Boutell & Tanis

[57] ABSTRACT

In an evaporation fuel control system, a failure diagnosis monitor of the evaporation fuel control system in the limited stable operating state, such as an exhaust gas mode or the like, can be performed so that the failure state is early detected and discharge of hydrocarbon (HC) into the atmosphere due to a leakage of the evaporation fuel from the evaporation fuel control system is prevented.

12 Claims, 8 Drawing Sheets

DIAGNOSING APPARATUS OF EVAPORATION FUEL CONTROL SYSTEM OF VEHICLE

FIELD OF THE INVENTION

The invention relates to a diagnosing apparatus of an evaporation fuel control system of a vehicle and, more particularly, to a diagnosing apparatus of an evaporation fuel control system of a vehicle which can execute a failure diagnosis monitor of the evaporation fuel control system in the stable operating state after the start of an internal combustion engine.

BACKGROUND OF THE INVENTION

The evaporation fuel which leaks into the atmosphere from a fuel tank, a float chamber of a carburetor, or the like contains a large quantity of hydrocarbon (HC) and becomes one of the causes of the air pollution and also results in a loss of fuel. Therefore, various kinds of techniques to prevent the evaporation fuel have been known. As a typical technique, there is an evaporation fuel control system in which the evaporation fuel of the fuel tank is purged to a canister enclosing an adsorbent, such as activated carbon or the like, therein in accordance with the operating state of an internal combustion engine. When the engine is operated, the evaporated fuel absorbed and held in the canister is purged to and supplied to the internal combustion engine.

Such fuel evaporation control systems have been disclosed in, for instance, JP-A-2-130255 and JP-A-3-26862. According to the fuel evaporation control system disclosed in JP-A-2-130255, an abnormality wherein the absorbed fuel gas is not supplied from the canister into an engine intake pipe because of a failure of a control valve, closure of a supply passage, disconnection thereof, or the like is detected on the basis of a detection pressure between the control valve and a canister, thereby detecting that the fuel gas is discharged to the atmosphere.

The abnormality detecting apparatus comprises a feed passage to lead a fuel gas adsorbed on adsorbent in the canister into the engine intake pipe by a negative pressure generated in the intake pipe. A control valve to open or close the feed passage in accordance with the operating state of the internal combustion engine is provided. Pressure detecting means for detecting the aforesaid pressure between the canister and the control valve is provided. Abnormality detecting apparatus for detecting an abnormality in the supply of the fuel gas from the canister into the intake pipe due to an abnormality of either one of the canister feed passage or the control valve on the basis of a detection pressure of the pressure detecting means thereby is provided.

According to the fuel evaporation control system disclosed in JP-A-3-26862, whether the system is operating in a normal or abnormal mode is detected by a self diagnosing apparatus on the basis of a boost pressure in an engine intake passage and a pressure in a purge line.

The self diagnosing apparatus comprises means for detecting whether an area is a fuel purge area or not; means for detecting a pressure of a purge line; means for detecting or arithmetically operating a boost pressure on the downstream side of a purge fuel introducing section of an engine intake passage; and detecting means for detecting whether the system is normal or abnormal on the basis of the purge line pressure and the boost pressure when it is detected that the area is the fuel purge area or not the fuel purge area by detection signals generated by the aforesaid detecting means. The abnormality of the system can be certainly accurately detected, and the reliability of the system is improved.

In the conventional evaporation fuel control system, however, the failure diagnosis monitor of the system cannot be performed in a limited stable operating state such as an exhaust gas mode or the like. Therefore, even if the evaporation fuel leaks to atmosphere in the above system, such a leakage state cannot be detected and prevented whereby hydrocarbon (HC) is discharged into the atmosphere and causes air pollution.

Figure 6:
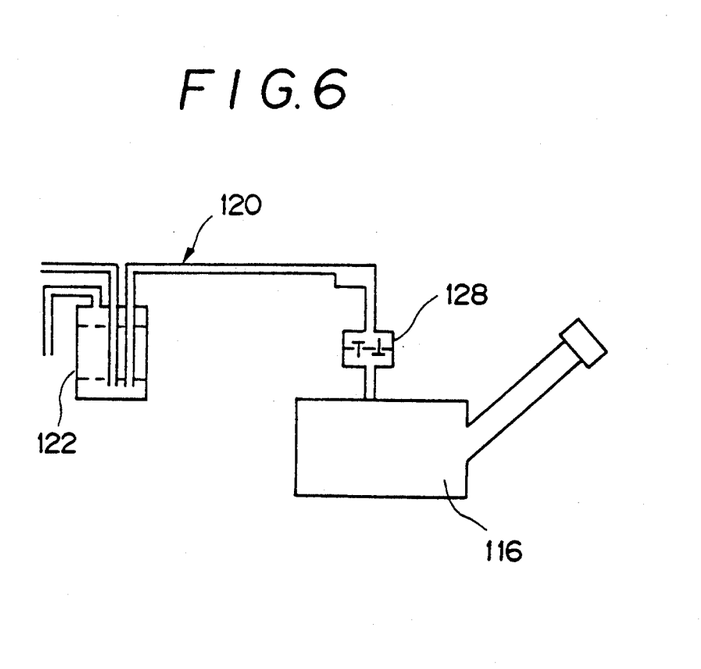
FIG. 6 is a schematic enlarged diagram of a fuel tank portion showing a prior art of the invention.

There is also an apparatus in which the tank inner pressure as a pressure in the fuel tank is restricted to a predetermined value or less. As shown in FIG. 6, a canister 122 is arranged in the way of a passage 120 to communicate an intake passage of an internal combustion engine (not shown) and a fuel tank 116 and a check valve 128 are arranged in the way of the passage 120 between the canister 122 and the fuel tank 116.

In this instance, even when the check valve 128 has a set value that has been suppressed to a restricted value or less, it is actually desirable to increase the set value of the check valve as large as possible so long as it doesn't exceed the restricted value in order to suppress the generation of the evaporation fuel from the fuel tank as small as possible.

However, there is a fear that the tank inner pressure cannot be held to the restricted value or less due to factors such as manufacturing error of the check valve, sudden increase in tank inner pressure during the operation, and the like. This apparatus is thus inconvenient and practically disadvantageous.

Further, when the check valve is interposed in the manner described, there is a fear that the tank inner pressure will fluctuate due to the check valve when the tank inner pressure is detected such that apparatus reliability and use efficiency deteriorate.

SUMMARY OF THE INVENTION

To eliminate the above disadvantages, according to the present invention, in an evaporation fuel control system of a vehicle for supplying and controlling an evaporation fuel adsorbed and held to a canister into an internal combustion engine in accordance with an operating state of the internal combustion engine, the system is characterized in that it has system failure diagnosing means for discriminating conditions before the start of a failure diagnosis in accordance with a temperature state of a cooling water at the start of the internal combustion engine and for executing a failure diagnosis monitor of the evaporation fuel control system in the case where a condition such that the cooling water temperature is equal to or higher than a set value and special conditions according to the operating state of the internal combustion engine and/or a running state of the vehicle are satisfied.

According to the construction of the invention, the system failure diagnosing means discriminates the conditions before the start of the failure diagnosis in accordance with the cooling water temperature state at the start of the internal combustion engine and executes the failure diagnosis monitor of the evaporation fuel control system in the situation where the condition that the cooling water temperature is equal to or larger than the set value and the special conditions according to the operating state of the internal combustion engine and/or the running state of the vehicle are satisfied. Due to this, the failure diagnosis monitor of the evaporation fuel control system in the limited stable operating state such as an exhaust gas mode or the like can be executed. A failure of the evaporation fuel control system is detected early. Consequently, it is possible to prevent hydrocarbon (HC) discharge into the atmosphere due to the leakage of the evaporation fuel from the evaporation fuel control system.

Apparatus in accordance with one embodiment of the invention is characterized in that a check valve to adjust a tank inner pressure is arranged in the way of a passage between the fuel tank and the canister, a bypass passage to bypass the check valve is provided, an electromagnetic valve to open or close the passage is arranged in the way of the bypass passage, a pressure sensor to communicate with a passage between the fuel tank and the check valve is provided, and a control unit to control in a manner such that the electromagnetic valve is opened and the intake passage of the internal combustion engine and the pressure sensor are communicated when predetermined conditions are satisfied is provided.

According to this embodiment of the invention, when the predetermined conditions are satisfied, the control unit controls in a manner that the electromagnetic valve is opened and the intake passage of the internal combustion engine and the pressure sensor are communicated. The presence or absence of the leakage is detected. The leakage of the evaporation system is certainly detected. The leakage of hydrocarbon (HC) into the atmosphere from the system is prevented. A failure of the electromagnetic valve is also detected.

DETAILED DESCRIPTION

Figure 1:
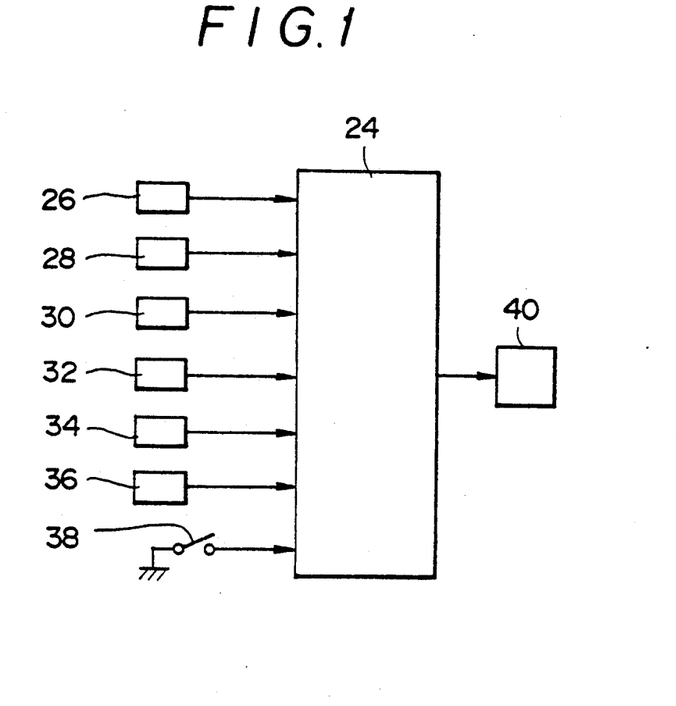
FIG. 1 is a circuit diagram of a diagnosing apparatus of an evaporation fuel control system.
Figure 2:
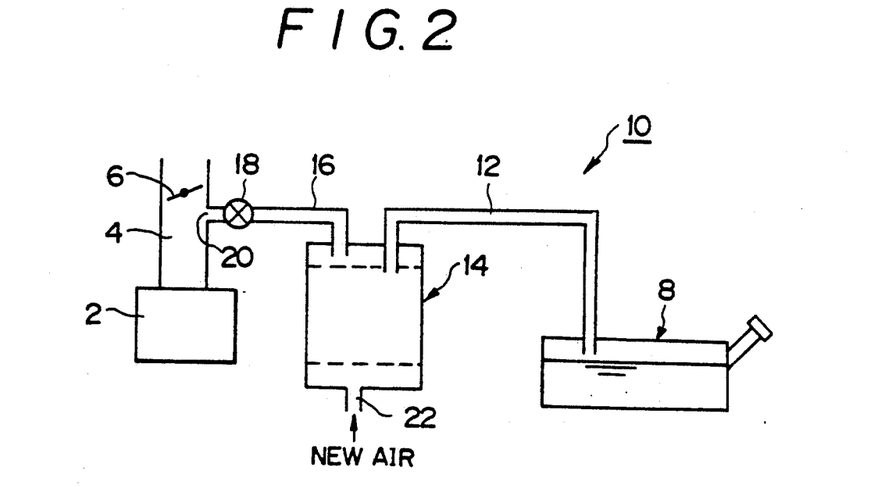
FIG. 2 is a constructional diagram of the evaporation fuel control system.
Figure 3:
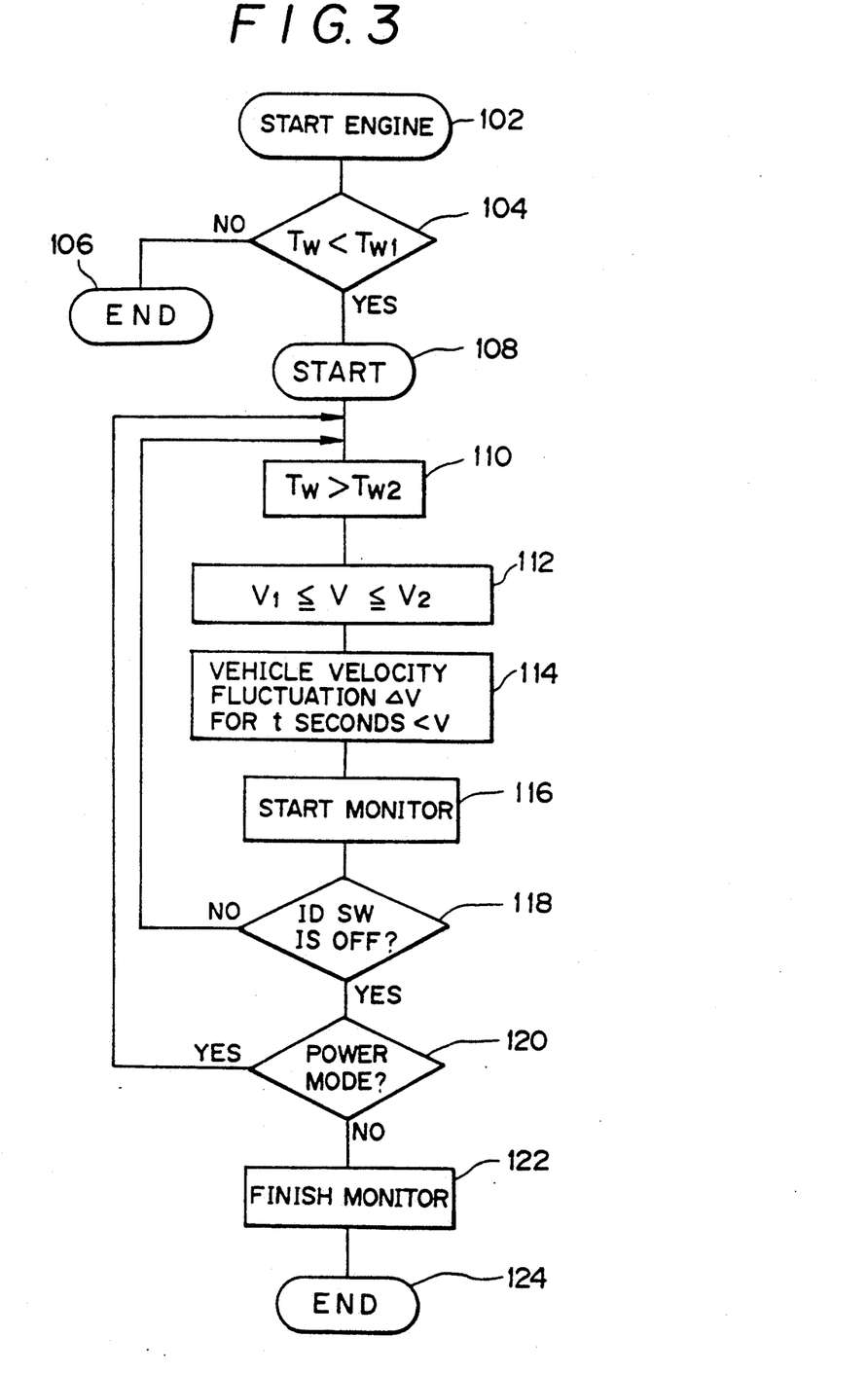
FIG. 3 is a flowchart for explaining the operation of the first embodiment of the invention.

Embodiments of the present invention will be practically described in detail hereinbelow on the basis of the drawings. FIGS. 1 to 3 show the first embodiment of the invention. In FIG. 2, reference numeral 2 denotes an internal combustion engine which is installed in a vehicle (not shown); 4 denotes an intake passage; 6 denotes a throttle valve; 8 denotes a fuel tank; and 10 denotes an evaporation fuel control system. The evaporation fuel control system 10 has an evaporation passage 12, a canister 14, a purge passage 16, and a purge valve 18.

One end of the evaporation passage 12 is communicated and opened to the upper portion of the fuel tank 8 and the other end is communicated and opened into the canister 14.

One end of the purge passage 16 is communicated and opened to the upper portion of the canister 14 and a purge port 20 on the other end is communicated to the intake passage 4 on the downstream side of the throttle valve 6.

The canister 14 encloses therein an adsorbent, such as an activated carbon or the like, to adsorb and hold the evaporation fuel from the fuel tank 8. The evaporation fuel adsorbed and held by the adsorbent is purged from the canister 14 through the purge passage 16 by introducing new ambient air via an atmosphere introducing port 22 in the lower portion in accordance with the operating state of the internal combustion engine 2, thereby flowing the purged evaporated fuel to the purge passage 16.

In the evaporation fuel system 10, system failure diagnosing means 24 is provided as shown in FIG. 1 in order to monitor the failure diagnosis when the evaporation fuel leaks or the like.

On the input side to the system failure diagnosing means 24, there are connected: a cooling water temperature sensor 26 to detect a cooling water temperature of the internal combustion engine 2; a vehicle velocity sensor 28 to detect a vehicle velocity; and engine rotational speed sensor 30 to detect a rotational speed of the internal combustion engine 2; and intake pipe pressure sensor 32 to detect an intake pipe pressure of the intake passage 4; a throttle opening degree sensor 34 to detect an opening degree state of the throttle valve 6; a mode detecting sensor 36 to detect the operating mode of the vehicle; and an idling switch 38 which is turned on when the internal combustion engine 2 is set into the idling operation. On the output side, a failure alarming unit 40 is connected to the system failure diagnosing means 24.

The system failure diagnosing means 24 comprises a suitable computer unit receiving various kinds of signals from the above sensors and the like and discriminates the conditions before the start of the failure diagnosis in accordance with the cooling water temperature state at the start of the internal combustion engine 2 and executes the failure diagnosis monitor of the evaporation fuel control system 10 in the situation where a condition such that the cooling water temperature is equal to or larger than a set value and special conditions according to the operating state of the internal combustion engine 2 and/or the running state of the vehicle are satisfied.

The operation of the first embodiment will now be described on the basis of a flowchart of FIG. 3.

When the internal combustion engine 2 is started (step 102), the system failure diagnosing means 24 first discriminates whether a cooling water temperature $T_w$ of the internal combustion engine 2 is ($T_w < T_{w1}$) as a cooling water temperature state or not (step 104). $T_{w1}$ denotes the first set temperature (for example 35° C.) at the time of the start of the internal combustion engine 2 or just after the start of the engine.

When $T_w > T_{w1}$ and the answer is NO in step 104, the conditions before the start of the failure diagnosis monitor are not satisfied, so that the monitor computer program is finished (step 106).

When $T_w < T_{w1}$ and YES in step 104, the monitor conditions are satisfied and the monitor can be started, so that the monitor is started (step 108).

The system waits until the cooling water temperature $T_w$ is set to $(T_w > T_{w2})$ (step 110). $T_{w2}$ denotes a second set temperature (e.g., 50° C.). That is, a condition such that the cooling water temperature $T_w$ is equal to or higher than the second set temperature $T_{w2}$ as a set value is satisfied.

As a special condition of the running state of the vehicle, the system waits until a vehicle velocity V lies within a range of $V_1 \leq V \leq V_2$ (step 112). $V_1$ denotes a first set velocity (for example, 50 km/h). $V_2$ denotes a second set velocity (e.g., 100 km/h).

In step 112, as a special condition of the operating state of the internal combustion engine 2, the above-mentioned condition can be also replaced to a condition that an engine rotational speed $N_e$ lies within a range of $N_{e1} \leq N_e \cdot N_{e2}$. In this case, $N_{e1}$ denotes a first set engine rotational speed (e.g. 2000 r.p.m.) and $N_{e2}$ denotes a second set engine rotational speed (e.g., 5000 r.p.m.).

The system subsequently waits until a vehicle velocity fluctuation $\Delta v$ of a specified time (t seconds) is set to $\Delta v < v$ (step 114). The specified time (t seconds) is equal to, for example, five seconds. v denotes a specified vehicle velocity change amount (e.g., 5 km/h). Further, when the vehicle is in a stable running state in which the vehicle velocity fluctuation $\Delta v$ in the specified time (t seconds) is equal to or lower than the vehicle velocity V (km/h), the vehicle velocity fluctuation $\Delta v$ in, e.g., the specified time (t seconds) is such that $\Delta v = 2$ km/h.

In step 114, the special condition of the operating state of the internal combustion engine 2 can be also replaced by either one of the condition that an intake pipe pressure fluctuation $\Delta P$ in the specified time is less than a specific intake pipe pressure change amount P, the condition such that a throttle opening degree fluctuation $\Delta T_a$ in the specified time is less than a specific throttle opening degree change amount $T_a$, and the condition that an engine rotational speed fluctuation $\Delta N_e$ in the specified time is less than a specific engine rotational speed change amount $N_e$.

Since the starting conditions of the monitor are satisfied due to this, the monitor is started (step 116).

During the monitoring operation, a check is made to see if the idling switch 38 is OFF or not (step 118). If YES in step 118, a check is made by the signal from the mode detecting sensor 36 to see if the operating mode has been set to the power mode or not (step 120).

If NO in step 120, the monitoring operation is finished (step 122) and the program is finished (step 124).

If NO in step 118 and if YES in step 120, the processing routine is returned to step 110 to execute the monitor state.

That is, when the idling switch 38 is turned on or the power area (feedback stop area) has been set during the failure diagnosis monitoring operation, the monitor is stopped and the processing routine is returned to the first step. When the idling switch 38 is OFF and the feedback state is set, the monitor is satisfied and the processing routine is finished.

According to the first embodiment, the monitor can be executed only when the internal combustion engine 2 is started from the state of a low temperature at which the cooling water temperature $T_w$ at the start of the internal combustion engine 2 is equal to or lower than the first set temperature $T_{w1}$. Consequently, it is possible to perform the failure diagnosis monitor of the evaporation fuel control system 10 in the limited stable operating state such as an exhaust gas mode or the like. When a failure occurs, the failure alarming unit 40 is made operative, the failure can be detected early, and it is possible to prevent that hydrocarbon (HC) leaks into the atmosphere by a trouble such as a leakage of the evaporation fuel from the evaporation fuel control system 10 or the like.

Figure 4:
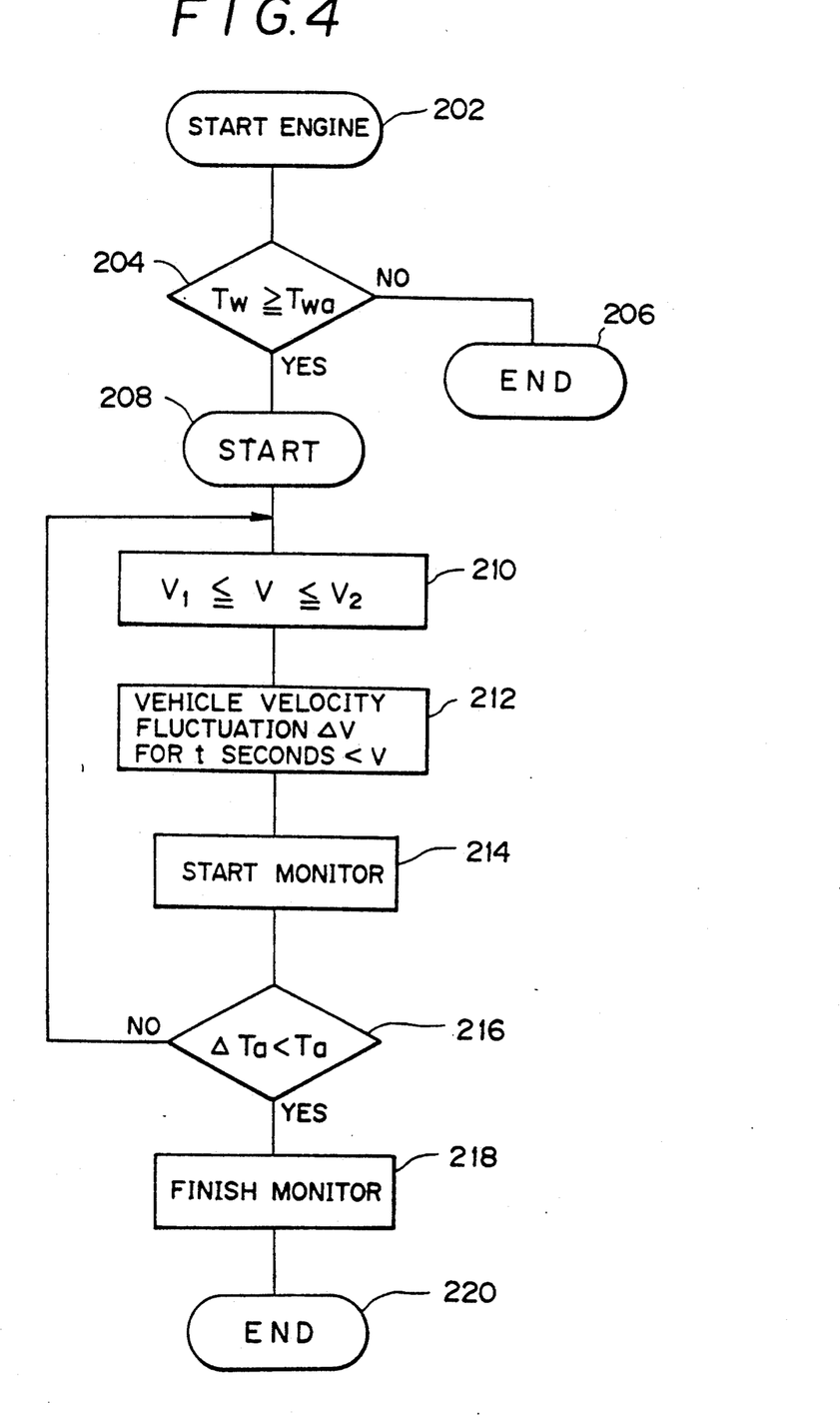
FIG. 4 is a flowchart for explaining the operation of the second embodiment of the invention.

FIG. 4 shows the second embodiment of the invention and shows a failure diagnosis monitoring procedure in the system failure diagnosing means 24.

That is, when the internal combustion engine 2 is started (step 202), a check is first made to see if the cooling water temperature $T_w$ of the internal combustion engine 2 is $T_w \geq T_{wa}$ or not (step 204). $T_{wa}$ denotes a third set temperature (e.g., 60° C.) at the start of the internal combustion engine 2 or just after the start of the engine.

When $T_w < T_{wa}$ and NO in step 204, the conditions before the start of the failure diagnosis monitor are not satisfied, so that the program is finished (step 206).

When $T_w \geq T_{wa}$ and YES in step 204, the condition such that the cooling water temperature $T_w$ is equal to or higher than the third set temperature $T_{wa}$ as a set value is satisfied and the monitor conditions are satisfied, so that the monitor can be started and the monitor is started (step 208).

As a special condition of the running state of the vehicle, the system waits until the vehicle velocity V lies with a range of $V_1 \leq V \leq V_2$ (step 210). $V_1$ denotes the first set vehicle velocity (e.g., 50 km/h) and $V_2$ denotes the second set vehicle velocity (e.g., 100 km/h)

In step 210, the special condition of the operating state of the internal combustion engine 2 can be also replaced by a condition such that the engine rotational speed $N_e$ lies within a range of $N_{e1} \leq N_e \leq N_{e2}$. In this case, $N_{e1}$ denotes the first set engine rotational speed (e.g., 2000 r.p.m.) and $N_{e2}$ denotes the second set engine rotational speed (e.g., 5000 r.p.m.).

Subsequently, the system waits until the vehicle velocity fluctuation $\Delta v$ in the specified time (t seconds) is set to $\Delta v < v$ (step 212). The specified time (t seconds) is equal to, e.g., five seconds. v denotes the specified vehicle velocity change amount (e.g., 5 km/h). Further, in the stable running state in which the vehicle velocity fluctuation $\Delta v$ in the specified time (t seconds) is equal to or lower than the vehicle velocity V (km/h), for instance, the vehicle velocity fluctuation $\Delta v$ in the specified time (t seconds) is set to $\Delta v = 2$ km/h.

In step 212, the special condition of the operating state of the internal combustion engine 2 can be also replaced by either one of the condition such that the intake pipe pressure fluctuation $\Delta P$ in the specified time is less than the specific intake pipe pressure change amount P, the condition such that the throttle opening degree fluctuation $\Delta T_a$ in the specified time is less than the specific throttle opening degree change amount $T_a$, and the condition such that the engine rotational speed fluctuation $\Delta N_e$ in the specified time is less than the specific engine rotational speed change amount $N_e$.

Due to this, since the starting conditions of the monitor are satisfied, the monitor is started (step 214).

A check is made to see if the throttle opening degree fluctuation $\Delta T_a$ in the specified time is less than the specific throttle opening degree change amount $T_a$ (e.g., 5°) or not (step 216).

In step 216, the special condition of the running state of the vehicle can be replaced to the condition such that the vehicle velocity fluctuation $\Delta v$ in the specific time is less than the specific vehicle velocity change amount V. Or, the special condition of the operating state of the internal combustion engine 2 can be also replaced to the condition such that the intake pipe pressure fluctuation $\Delta P$ in the specific time is less than the specific intake pipe pressure change amount P or the condition such that the engine rotational speed fluctuation $\Delta N_e$ in the specified time is less than the specific engine rotational speed change amount $N_e$.

If NO in step 216, the monitor is stopped and the processing routine is returned to step 210.

On the other hand, if YES in step 216, the monitor is finished (step 218) and the program is finished (step 220).

That is, in the second embodiment, the monitor is executed only at the restart of the engine in the case where the cooling water temperature $T_w$ at the start of the internal combustion engine 2 is equal to or higher than the third set temperature $T_{wa}$. Therefore, in the situation where an adsorption amount of the evaporation fuel to the canister 14 is large and a purge amount of the evaporation fuel just after the start of the internal combustion engine 2 is large and the like, even if there is a fear of occurrence of a failure in the air fuel ratio control of the internal combustion engine 2 due to the execution of the monitor, the monitor is executed after a fairly large quantity of evaporation fuel of the canister 14 was purged after completion of the perfect warming-up operation or after the vehicle had run to a certain extent. Therefore, a fear such that the air fuel ratio control of the internal combustion engine 2 is obstructed is eliminated.

Figure 5:
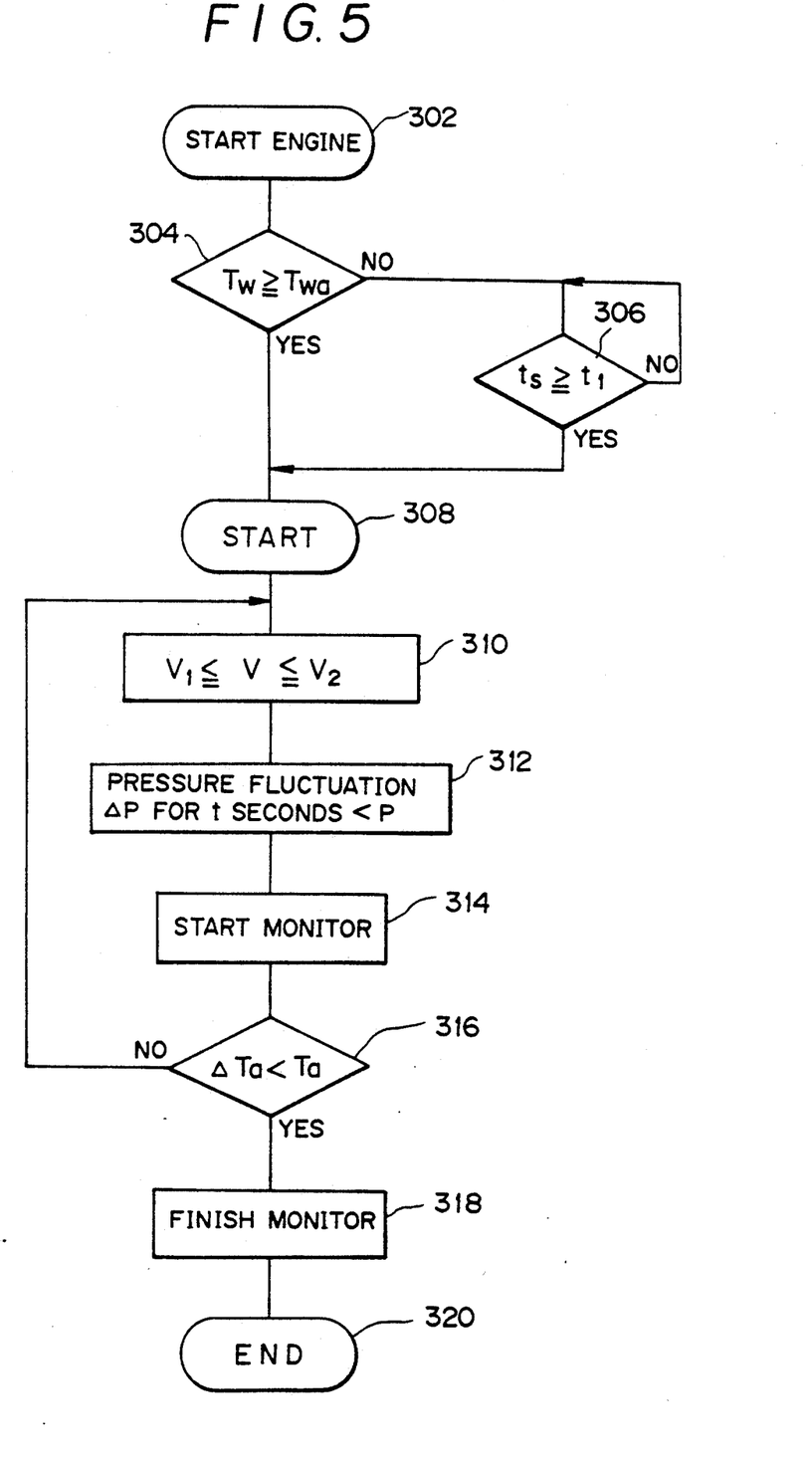
FIG. 5 is a flowchart for explaining the operation of the third embodiment of the invention.

FIG. 5 shows the third embodiment of the invention and shows a failure diagnosing procedure in the system failure diagnosing means 24.

That is, when the internal combustion engine 2 is started (step 302), a check is first made to see if the cooling water temperature $T_w$ of the internal combustion engine 2 is set to $T_w \geq T_{wa}$ or not (step 304). $T_{wa}$ denotes the third set temperature (e.g., 60° C.) at the start of the internal combustion engine 2 or just after the start of the engine.

When $T_w \leq T_{wa}$ and NO in step 304, the system waits until an elapsed time $t_s$ after the start of the internal combustion engine 2 is set to $t_s \geq t_1$ or not (step 306). $t_1$ denotes a specified time (e.g., 600 seconds).

When the relation of $t_s \geq t_1$ is satisfied in step 306 and if $T_w \geq T_{wa}$ and YES in step 304, the monitor conditions are satisfied and the monitor can be started, so that the monitor is started (step 308).

As a special condition of the running state of the vehicle, the system waits until the vehicle velocity V lies within a range of $V_1 \leq V_2 \leq V_2$ (step 310). $V_1$ denotes the first set vehicle velocity (e.g., 50 km/h). $V_2$ denotes the second set vehicle velocity (e.g., 100 km/h).

In step 310, the special condition of the operating state of the internal combustion engine 2 can be also replaced to the condition such that the engine rotational speed $N_e$ lies within a range of $N_{e1} \leq N_e \leq N_{e2}$. In this case, $N_{e1}$ denotes the first set engine rotational speed (e.g., 2000 r.p.m.) and $N_{e2}$ denotes the second set engine rotational speed (e.g., 5000 r.p.m.).

Subsequently, the system waits until the intake pipe pressure fluctuation $\Delta P$ in the specified time (t seconds) is set to $\Delta P < p$ (step 312). P denotes the specific intake pipe pressure change amount.

In step 312, the special condition of the running state of the vehicle can be also replaced to the condition such that the vehicle velocity fluctuation $\Delta v$ in the specified time is less than the specific vehicle velocity change amount v, or the special condition of the operating state of the internal combustion engine 2 can be also replaced to either one of the condition such that the throttle opening degree fluctuation $\Delta T_a$ in the specified time is less than the specific throttle opening degree change amount $T_a$ and the condition such that the engine rotational speed fluctuation $\Delta N_e$ in the specified time is less than the specific engine rotational speed change amount $N_e$.

Due to this, since the starting conditions of the monitor are satisfied, the monitor is started (step 314).

A check is made to see if the throttle opening degree fluctuation $\Delta T_a$ in the specified time is less than the specific throttle opening degree change amount $T_a$ (e.g., 5°) or not (step 316).

In step 316, the special condition of the running state of the vehicle can be replaced to the condition such that the vehicle velocity fluctuation $\Delta v$ in the specified time is less than the specific vehicle velocity change amount v. Or, the special condition of the operating state of the internal combustion engine can be also replaced to the condition such that the intake pipe pressure fluctuation $\Delta P$ in the specified time is less than the specific intake pipe pressure change amount P or the condition such that the engine rotational speed fluctuation $\Delta N_e$ in the specified time is less than the specific engine rotational speed change amount $N_e$.

If NO in step 316, the monitor is stopped and the processing routine is returned to step 310.

On the other hand, if YES in step 316, the monitor is finished (step 318) and the program is finished (step 320).

That is, in the third embodiment, even when the cooling water temperature $T_w$ at the start of the internal combustion engine 2 is equal to or lower than the third set temperature $T_{wa}$, when the elapsed time $t_s$ after the start of the internal combustion engine 2 has elapsed the specified time $t_1$ (e.g., 600 seconds) or more, the monitor is executed. Due to this, in the case where an adsorption amount of the evaporation fuel to the canister 14 is large and a purge amount of the evaporation fuel just after the start of the internal combustion engine 2 is large or the like, even if there is a fear that the air fuel ratio control of the internal combustion engine 2 is obstructed due to the execution of the monitor, the monitor is executed after a fairly large quantity of evaporation fuel of the canister 14 was purged after completion of the perfect warming-up or after the vehicle ran to a certain extent. Therefore, a fear that the air fuel ratio control of the internal combustion engine 2 is obstructed is eliminated.

As will be obviously understood from the above detailed description, according to the invention, there is provided a system failure diagnosing means for discriminating the conditions before the start of the failure diagnosis in accordance with the cooling water temperature state at the start of the internal combustion engine and for executing the failure diagnosis monitor of the evaporation fuel control system in the situation where the condition that the cooling water temperature is equal to or higher than the set value and the special conditions according to the operating state of the internal combustion engine and/or the running state of the vehicle are satisfied. Therefore, the failure diagnosis monitor of the evaporation fuel control system in the limited stable operating state, such as an exhaust gas mode or the like, can be performed and the failure state is detected early. Thus, it is possible to prevent that hydrocarbon (HC) from being discharged into the atmosphere due to a leakage of the evaporation fuel from the evaporation fuel control system.

Figure 7:
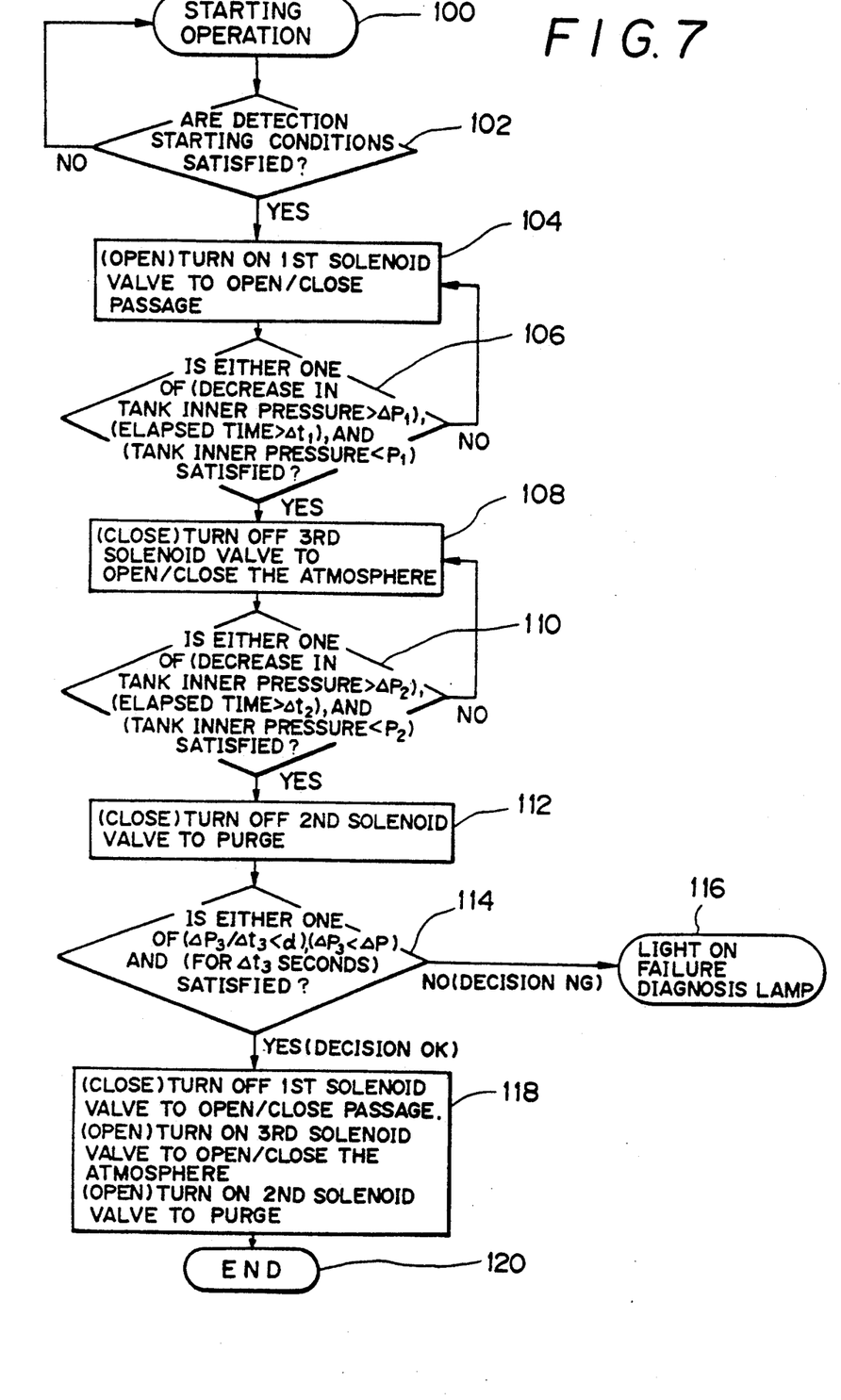
FIG. 7 is a flowchart for control of a diagnosing apparatus of an evaporation fuel control system showing the first embodiment of the invention.
Figure 8:
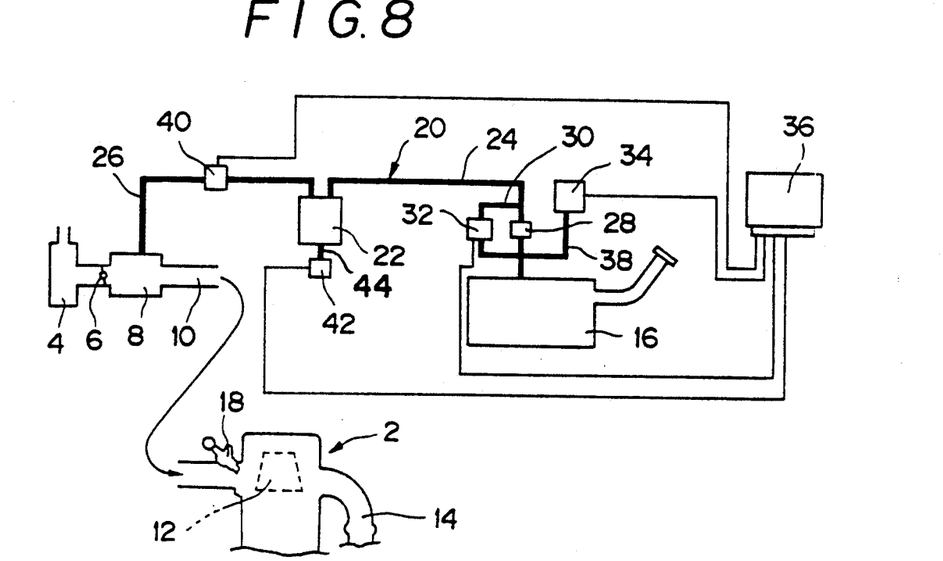
FIG. 8 is a schematic diagram of the diagnosing apparatus of the evaporation fuel control system.
Figure 9:
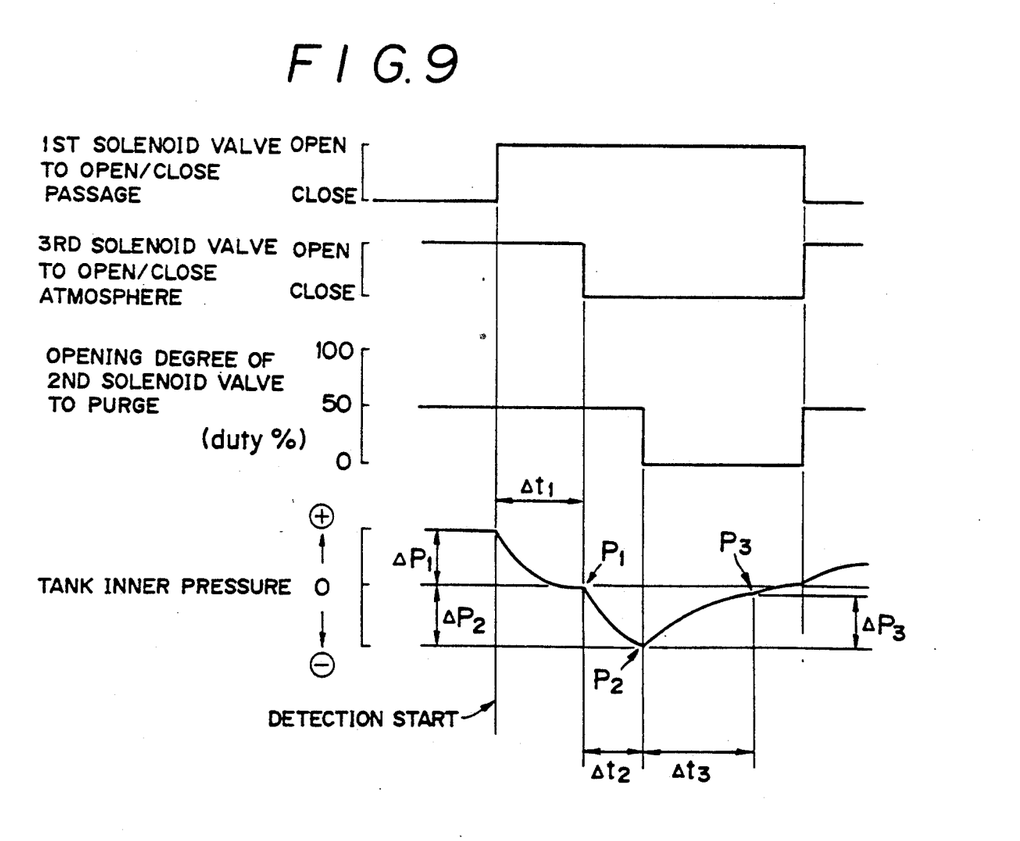
FIG. 9 is a time chart of the diagnosing apparatus of the evaporation fuel control system.

FIGS. 7 to 9 show a further embodiment of the invention. In FIG. 8, wherein like reference numerals are used for like features of previously described embodiments, reference numeral 2 denotes an internal combustion engine; 4 denotes an air cleaner; 6 a throttle valve; 8 a surge tank; 10 an intake passage; 12 a combustion chamber; 14 an exhaust passage; and 16 a fuel tank. In the internal combustion engine 2, a fuel injection valve 18 is arranged in the intake passage 10 so as to be directed in the direction of the combustion chamber 12. The fuel injection valve 18 is communicated with the fuel tank 16 by a fuel passage (not shown).

The fuel in the fuel tank 16 is fed to the fuel injection valve 18 through the fuel passage by a fuel pump (not shown) and is supplied together with the air into the combustion chamber 12 and is combusted. The exhaust air produced by the combustion is discharged by the exhaust passage 14.

A passage 20 to communicate the intake passage 10 of the internal combustion engine 2, for example, the surge tank 8 on the downstream side of the throttle valve 6 and the fuel tank 16 is provided. A canister 22 to adsorb and hold the evaporation fuel is provided in the way of the passage 20.

The passage 20 is formed by a first passage 24 to communicate the fuel tank 16 and the canister 22 and a second passage 26 to communicate the canister 22 and the intake passage 10. Canister 22 includes atmosphere introducing port 44 for introducing new ambient air via the atmosphere.

A check valve 28 is provided in the way of the first passage 24. A bypass passage 30 is provided to bypass the check valve 28. A first solenoid valve 32 as an electromagnetic valve to open or close the passage is provided in the way of the bypass passage 30. A pressure sensor 34 to communicate with the first passage 24 between the fuel tank 16 and the check valve 28 is provided. A control unit 36 to control in a manner such that the first solenoid valve 32 is opened and the intake passage 10 of the internal combustion engine 2 and the pressure sensor 34 are communicated when predetermined conditions are satisfied is provided.

Explaining in detail, the check valve 28 is arranged in the first passage 24 between the fuel tank 16 and the canister 22. The check valve 28 sets the pressure in the fuel tank 16 and the pressure in the canister 22 into predetermined pressures, thereby suppressing a generation amount of hydro carbon (HC) in the fuel tank 16.

The first solenoid valve 32 is arranged in parallel with the check valve 28.

As shown in FIG. 8, between the check valve 28 and the fuel tank 16, the pressure sensor 34 is communicated through a pressure detecting passage 38 to the portion of the first passage 24 to which the bypass passage 30 is opened.

The first solenoid valve 32, the pressure sensor 34, a second solenoid valve 40 which is provided in the way of the second passage 26, and a third solenoid valve 42 for opening and closing atmosphere introducing port 44 of the canister 22 are connected to the control unit 36, respectively.

To reduce the influences on predetermined conditions, namely, the exhaust gas and the drivability, the control unit 36, such as a suitable computer control unit, decides that detection starting conditions are satisfied when, for instance, all of the following conditions are satisfied.

① A water temperature $T_w$: $T_w > T_{w2}$
   $T_{w2}$: set water temperature
② A vehicle velocity V: $V_1 \leq V \leq V_2$
   $V_1$: first set vehicle velocity
   $V_2$: second set vehicle velocity
③ A vehicle velocity fluctuation $\Delta v$ for t seconds: $\Delta v < v$
   $v$: set vehicle velocity fluctuation
④ An idling switch (ID SW) is OFF
⑤ A tank inner pressure P (at a gauge pressure): $P > P_t$
   $P_t$: set tank inner pressure (at gauge pressure)

The control unit 36 opens the first solenoid valve 32 and and communicates the intake passage 10 and the pressure sensor 34, thereby detecting the presence or absence of the leakage.

The operation will now be described in accordance with a control flowchart illustrated in FIG. 7 control of the diagnosing apparatus of the evaporation fuel control system of FIG. 8.

In the starting operation of the internal combustion engine 2, a program of the control flowchart is started (100).

A check is made to see if the detection starting conditions are satisfied or not (102). That is, a check is made to see if all of the following predetermined conditions are satisfied or not.

① The water temperature $T_w$: $T_w > T_{w2}$
   $T_{w2}$: set water temperature
② The vehicle velocity V: $V_1 \leq V \leq V_2$
   $V_1$: first set vehicle velocity
   $V_2$: second set vehicle velocity
③ The vehicle velocity fluctuation $\Delta v$ for t seconds: $\Delta v < v$
   $v$: set vehicle velocity fluctuation
④ The idling switch (ID SW) is OFF
⑤ The tank inner pressure (at gauge pressure) P: $P > P_t$
   $P_t$: set tank inner pressure (at gauge pressure)

If NO in the discriminating step (102), the above discriminating process is repeated until the answer is YES in step (102). If YES in step (102), the first solenoid valve 32 is turned on, namely, is opened (104).

In this instance, the fuel tank 16 and the canister 22 are communicated and the tank inner pressure is changed from the plus (+) side to the minus (−) side.

A check is now made to see if either one of the following discriminating conditions is satisfied or not (106).

① Whether a decrease in tank inner pressure P is larger than a first set change amount $\Delta P_1$ or not.
② Whether a first predetermined time $\Delta t_1$ has elapsed from the time point at which the detection starting conditions are satisfied or not.
③ Whether the tank inner pressure P is smaller than the first set value $P_1$ or not.

If NO in step (106), the processing routine is returned to the ON operation of the first solenoid valve 32 (104).

If YES in step (106), the third solenoid valve 42 is turned off, namely, is closed (108).

A check is now made to see if either one of the following discriminating conditions is satisfied or not (110).

① Whether a decrease in tank inner pressure P is larger than a second set change amount $\Delta P_2$ or not.

② Whether a second predetermined time $\Delta t_2$ has elapsed after the elapse of the first predetermined time $\Delta t_1$ or not.

③ Whether the tank inner pressure P is smaller than the second set value $P_2$ or not.

If NO in step (110), the processing routine is returned to the OFF operation of the third solenoid valve 42 (108). If YES in step (110), the second solenoid valve 40 to purge is turned off, namely, is closed (112).

In this instance, although the inside of the fuel tank is shut off from the outside, the tank inner pressure increases so as to gradually approach the atmospheric pressure. The leakage of the evaporation fuel control system is judged by a pressure change at this time.

That is, a check is made to see if either one of the following discriminating conditions is satisfied or not (114).

① In a range from a tank inner pressure $P_2$ to $P_3$ in the case where there is a leakage of $\phi_a$ (about $\phi_1$) or more in the evaporation system, whether the value which is obtained from (a third set change amount $\Delta P_3$ of the tank inner pressure which has actually been detected)/(a third time $\Delta t_3$) is smaller than the set value $\alpha$ which is obtained from (the set change amount of the tank inner pressure)/(time) or not.

② Whether the set change amount $\Delta P_3$ of the tank inner pressure is smaller than the set change amount $\Delta P$ of the tank inner pressure in the case where there is a leakage at the third time $\Delta t_3$ or not.

If NO in step (114), namely, if the result of the judgment is NG, a failure diagnosis lamp (not shown) is lit on (116), thereby informing the occurrence of the failure.

If YES in step (114), that is, if the result of the judgment is OK, the first solenoid valve 32 to open or close the passage is turned off, namely, is closed, the third solenoid valve 42 to open or close the atmosphere is turned on, namely, is opened, and the second solenoid valve 40 to purge is turned on, namely, is opened (118).

The program of the control flowchart of the diagnosing apparatus of the evaporation fuel control system is finished (120).

Due to this, the set values ($\alpha$, $\Delta P$) under the condition such that there is preliminarily a leakage are set and compared with the detected values and the presence or absence of the leakage can be judged. The leakage in the evaporation system can be certainly detected. The leakage of hydro carbon (HC) into the atmosphere from the system can be prevented. One of the causes of the air pollution can be eliminated. It is practically advantageous.

In the apparatus for discriminating the presence or absence of the leakage, failures of the first to third solenoid valves 32, 40, and 42 can be also diagnosed.

Further, since the construction of the diagnosing apparatus of the evaporation fuel control system is simple, the costs can be reduced and it is economically advantageous. As compared with the conventional apparatus, a time which is required for the failure diagnosis is shorter and the use efficiency can be improved.

Figure 10:
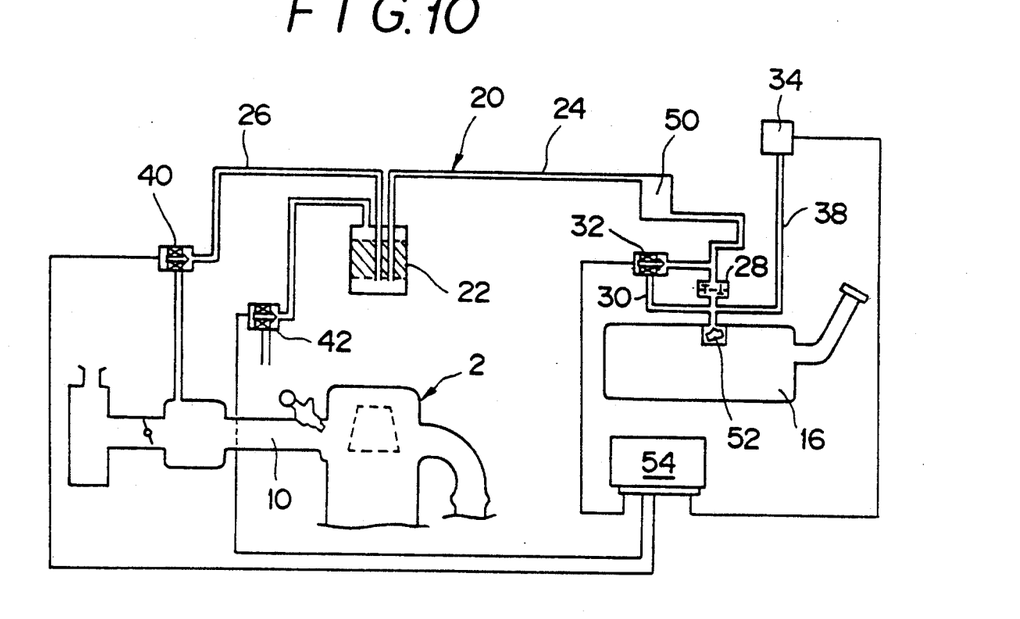
FIG. 10 is a schematic diagram of a diagnosing apparatus of an evaporation fuel control system showing the second embodiment of the invention.
Figure 11:
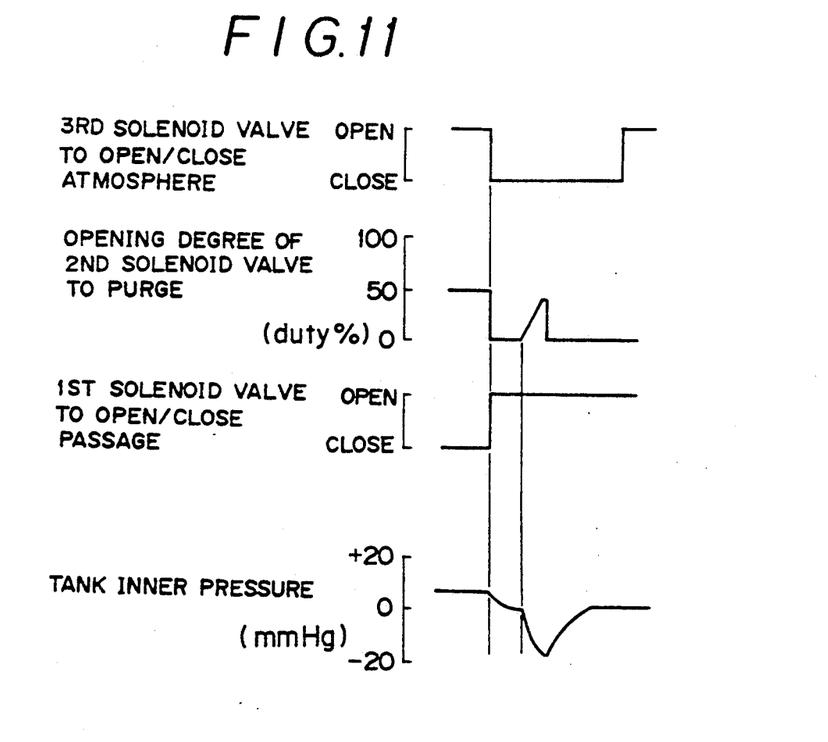
FIG. 11 is a time chart of the diagnosing apparatus of the evaporation fuel control system.

FIGS. 10 and 11 show a still further embodiment of the invention. In the second embodiment, the parts and components having the same functions as those in the first embodiment are designated by the same reference numerals and will be described.

The second embodiment has the following features.

That is, the passage 20 is formed by the first passage 24 to communicate the fuel tank 16 and the canister 22 and the second passage 26 to communicate the canister 22 and the intake passage 10. A separator 50 is provided in the way of the first passage 24. Reference numeral 52 denotes a rollover valve which is provided in the fuel tank 16.

The check valve 28 is provided in the way of the first passage 24. The bypass passage 30 to bypass the check valve 28 is provided. The first solenoid valve 32 as an electromagnetic valve to open or close the passage is provided in the way of the bypass passage 30. The pressure sensor 34 to communicate with the first passage 24 between the fuel tank 16 and the check valve 28 is provided. A control unit 54, such as a suitable computer control unit, to control in a manner such that the first solenoid valve 32 is opened and the intake passage 10 of the internal combustion engine 2 and the pressure sensor 34 are communicated when predetermined conditions are satisfied is provided.

Explaining in detail, the check valve 28 is arranged in the first passage 24 between the fuel tank 16 and the separator 50. The check valve 28 sets the pressure in the fuel tank 16 and the pressure in the canister 22 into predetermined pressures, thereby suppressing a generation amount of hydro carbon (HC) in the fuel tank 16.

The first solenoid valve 32 is provided in parallel with the check valve 28.

As shown in FIG. 10, between the check valve 28 and the fuel tank 16, the pressure sensor 34 is communicated through the pressure detecting passage 38 to the portion to which the bypass passage 30 is opened to the first passage 24.

The first solenoid valve 32, the pressure sensor 34, the second solenoid valve 40 to purge which is provided in the way of the second passage 26, and the third solenoid valve 42 to open or close the atmosphere of the canister 22 are connected to the control unit 54, respectively.

When the tank inner pressure exceeds the set value, the control unit 54 opens the first solenoid valve 32. When the tank inner pressure is equal to or less than the set value, the control unit maintains the closed state of the first solenoid valve 32.

When the airtightness is checked, the control unit 54 opens the first solenoid valve 32 and, after that, it temporarily opens the second solenoid valve 40 to purge.

When the tank inner pressure of the fuel tank 16 rises to a value which exceeds the set value, the control unit 54 opens the first solenoid valve 32 and communicates the intake passage 10 and the fuel tank 16 and reduces the tank inner pressure. On the contrary, when the tank inner pressure of the fuel tank 16 decreases to the set value or less, the control unit 54 closes the first solenoid valve 32, the tank inner pressure can be certainly controlled to the set value or less, a control precision of the pressure can be set to a high value, and it is practically advantageous.

Further, as shown in FIG. 11, when the airtightness is checked, the first solenoid valve 32 is opened in case of closing the third solenoid valve 42 to open or close the atmosphere. When the tank inner pressure drops to 0 mmHg, the second solenoid valve 40 to purge is opened for only a predetermined time, namely, temporarily. The intake passage 10 and the pressure sensor 34 are communicated and a negative pressure can be made to act on the pressure sensor 34.

Further, since the airtightness can be checked, that is, the presence or absence of the leakage can be discriminated, the leakage of the evaporation system can be certainly detected in a manner similar to the first embodiment. The leakage of hydro carbon (HC) into the atmosphere from the system can be prevented. One of the causes of the air pollution can be eliminated. It is practically advantageous.

The failures of the first to third solenoid valves 32, 40, and 42 can be also diagnosed, so that the use efficiency of the apparatus can be improved.

The invention is not limited to the above first and second embodiments but many variations and modifications are possible.

For example, in the first embodiment of the invention, opening degrees of the second solenoid valve to purge at the first predetermined time $\Delta t_1$ and second predetermined time $\Delta t_2$ have been set to 50 duty % and an opening degree of the second solenoid valve to purge at the third time $\Delta t_3$ has been set to 0 duty %. However, it is also possible to set in a manner such that the opening degree of the second solenoid valve to purge at the first predetermined time $\Delta t_1$ is set to 50 duty %, the opening degree of the second solenoid valve to purge at the second time $\Delta t_2$ is set to a predetermined value X duty %, and the opening degree of the second solenoid valve to purge at the third time $\Delta t_3$ is set to 0 duty %.

According to the invention as described in detail above, the check valve to adjust the tank inner pressure is provided in the way of the passage between the fuel tank and the canister, the bypass passage to bypass the check valve is provided, the electromagnetic valve to open/close the passage is provided in the way of the bypass passage, the pressure sensor to communicate with the passage between the fuel tank and the check valve is provided, and the control unit to control in a manner such that the electromagnetic valve is opened and the intake passage of the internal combustion engine and the pressure sensor are communicated when predetermined conditions are satisfied is provided. Therefore, the presence or absence of the leakage can be discriminated. The leakage of the evaporation system can be certainly detected. The leakage of hydrocarbon (HC) into the atmosphere from the system can be prevented. One of the causes of the air pollution can be eliminated. The failure of the electromagnetic valve can be also discriminated. The use efficiency can be improved.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a diagnosing apparatus of an evaporation fuel control system of a vehicle for supplying and controlling an evaporation fuel adsorbed and held in a canister to an internal combustion engine in accordance with an operating state of the internal engine, comprising the improvement wherein said diagnosing apparatus includes:

first means for determining whether engine cooling water temperature is below a first set value at the start-up of said internal combustion engine;

second means for determining when said cooling water temperature is equal to or above a second set value only if said first means initially determines that said cooling water temperature is below said first set value;

third means for discriminating one or more predetermined engine operating and/or vehicle running conditions when it is determined by said second means that said cooling water temperature is equal to or above said second set value; and fourth means for executing a failure diagnosis monitor of said evaporation fuel control system when said one or more predetermined engine operating and/or vehicle running conditions are satisfied.

2. In a diagnosing apparatus of an evaporation fuel control system of a vehicle for supplying and controlling an evaporation fuel adsorbed and held in a canister to an internal combustion engine in accordance with an operating state of the internal engine, comprising the improvement wherein said diagnosing apparatus includes:

failure diagnosis monitor means for executing a failure diagnosis of said system only when engine cooling water temperature is equal to or greater than a first set value; and means for actuating said failure diagnosis monitor means at or just after engine start-up only when said engine cooling water temperature is less than a second set value which is less than said first set value.

3. A diagnosing apparatus for an evaporation fuel control system of a vehicle, the evaporation fuel control system including a fuel tank coupled to an intake passage of an internal combustion engine via an evaporation fuel passage, a canister disposed in line with the evaporation fuel passage for adsorbing and holding evaporation fuel from the fuel tank, the canister having an atmosphere introducing port for introducing new air into the system, and a check valve means disposed in line with the evaporation fuel passage between the fuel tank and the canister for maintaining a predetermined pressure in the fuel tank, the diagnosing apparatus comprising:

a bypass passage for bypassing the check valve means, said bypass passage having one end coupled to the evaporation fuel passage at a first position located between the fuel tank and the check valve means, and another end coupled to the evaporation fuel passage at a second position located between the check valve means and the canister;

a pressure sensing means coupled to the evaporation fuel passage at the first position for sensing pressure in the fuel tank;

a first electromagnetic valve means disposed in line with said bypass passage for opening and closing said bypass passage in response to a first control signal;

a second electromagnetic valve means disposed in line with the evaporation fuel passage at a third position located between the canister and the intake passage for opening and closing the evaporation fuel passage in response to a second control signal;

a third electromagnetic valve means disposed within the atmosphere introducing port of the canister for communicating the port with the atmosphere in response to a third control signal; and control means for determining the presence or absence of evaporation fuel leakage in said evaporation fuel control system when one or more predetermined engine operating and/or vehicle running conditions are satisfied, said control means selectively generating said first, second and third control signals to determine said presence or absence of evaporation fuel leakage.

4. The apparatus of claim 1 wherein said second set value is greater than said first set value.

5. The apparatus of claim 1 wherein said one or more conditions comprise a vehicle velocity state or an engine rotational speed state.

6. The apparatus of claim 5 wherein said one or more conditions further comprise one of a vehicle velocity fluctuation over time, intake pipe pressure fluctuation over time, throttle opening degree fluctuation over time, and engine rotational speed fluctuation over time.

7. The apparatus of claim 6 wherein said one or more conditions further comprise an idling switch on/off state.

8. The apparatus of claim 3 wherein said one or more conditions include the engine cooling water temperature being equal to or greater than a set value.

9. The apparatus of claim 8 wherein said one or more conditions comprise a vehicle velocity state or an engine rotational speed state.

10. The apparatus of claim 9 wherein said one or more conditions further comprise one of vehicle velocity fluctuation over time, intake pipe pressure fluctuation over time, throttle opening degree fluctuation over time, and engine rotational speed fluctuation over time.

11. The apparatus of claim 10 wherein said one or more conditions further comprise an idling switch on/off state.

12. The apparatus of claim 2, wherein said failure diagnosing monitor means includes means for discriminating one or more predetermined engine operating and/or vehicle running conditions before executing said failure diagnosis monitor, said one or more predetermined engine operating and/or vehicle running conditions being from a group including a vehicle velocity state, an engine rotational speed, a vehicle velocity fluctuation over time, a throttle opening degree fluctuation over time, an engine rotational speed fluctuation over time, and an idling switch on/off state.

* * * * *